UNITED STATES PATENT OFFICE.

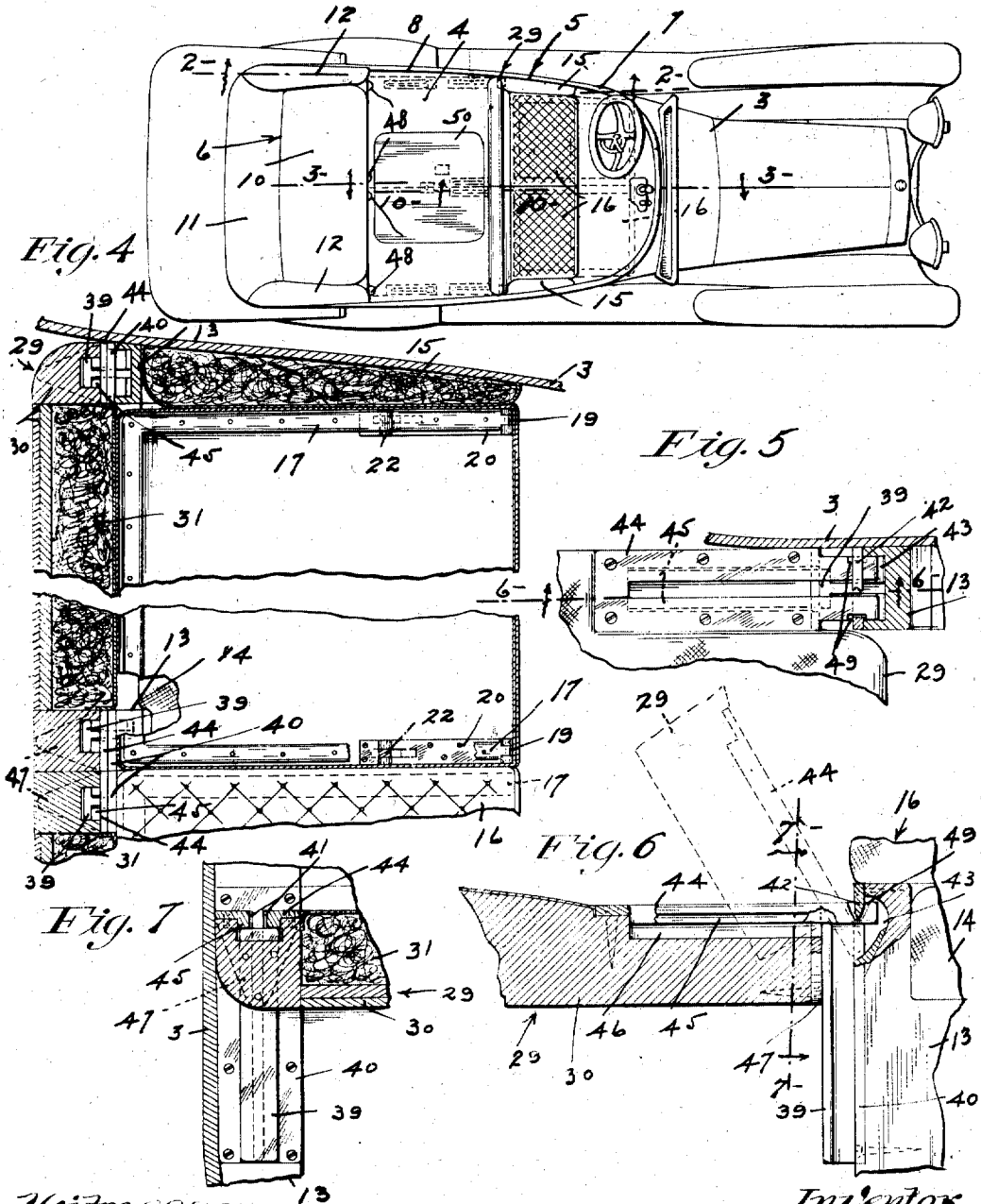

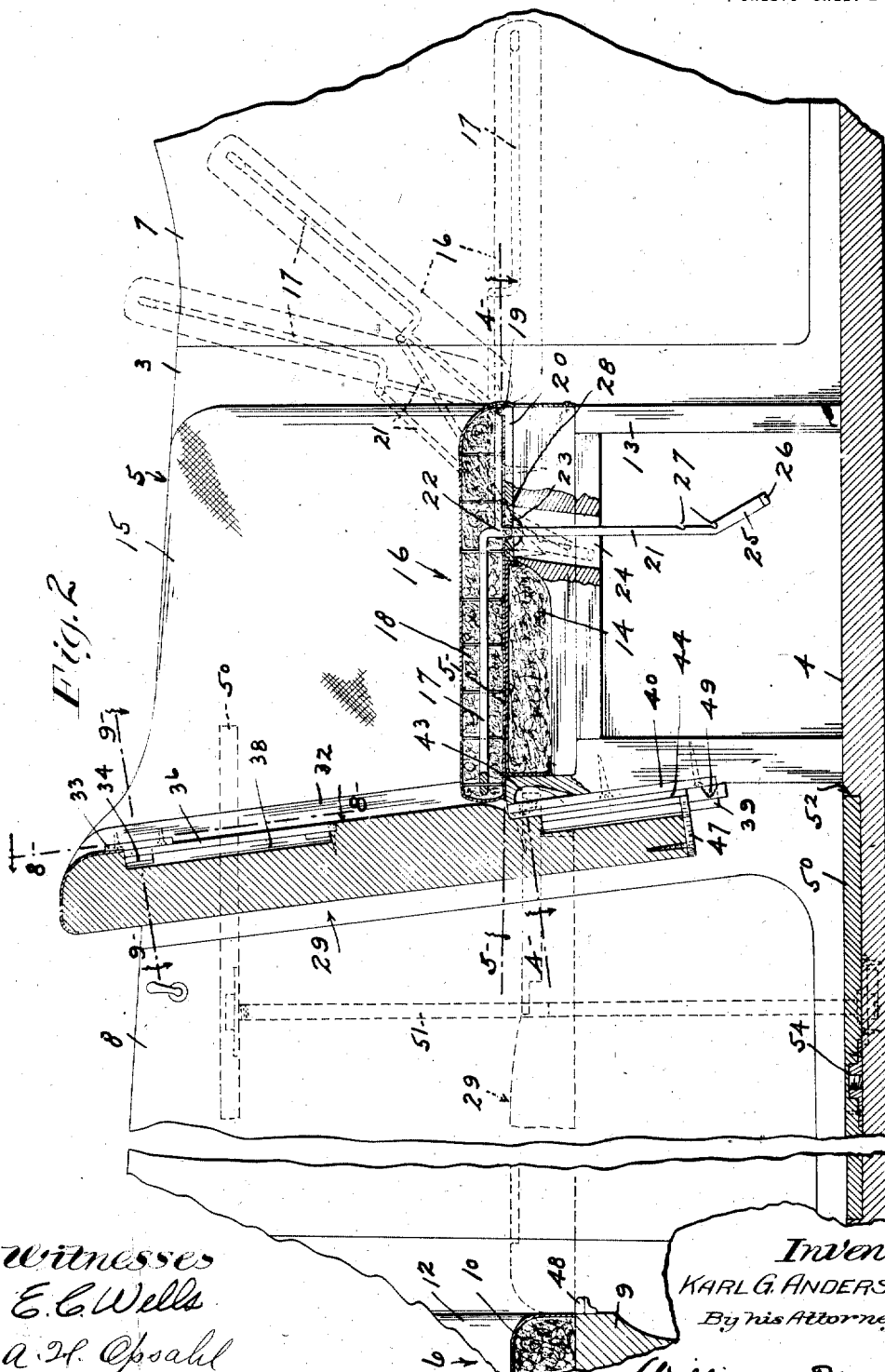

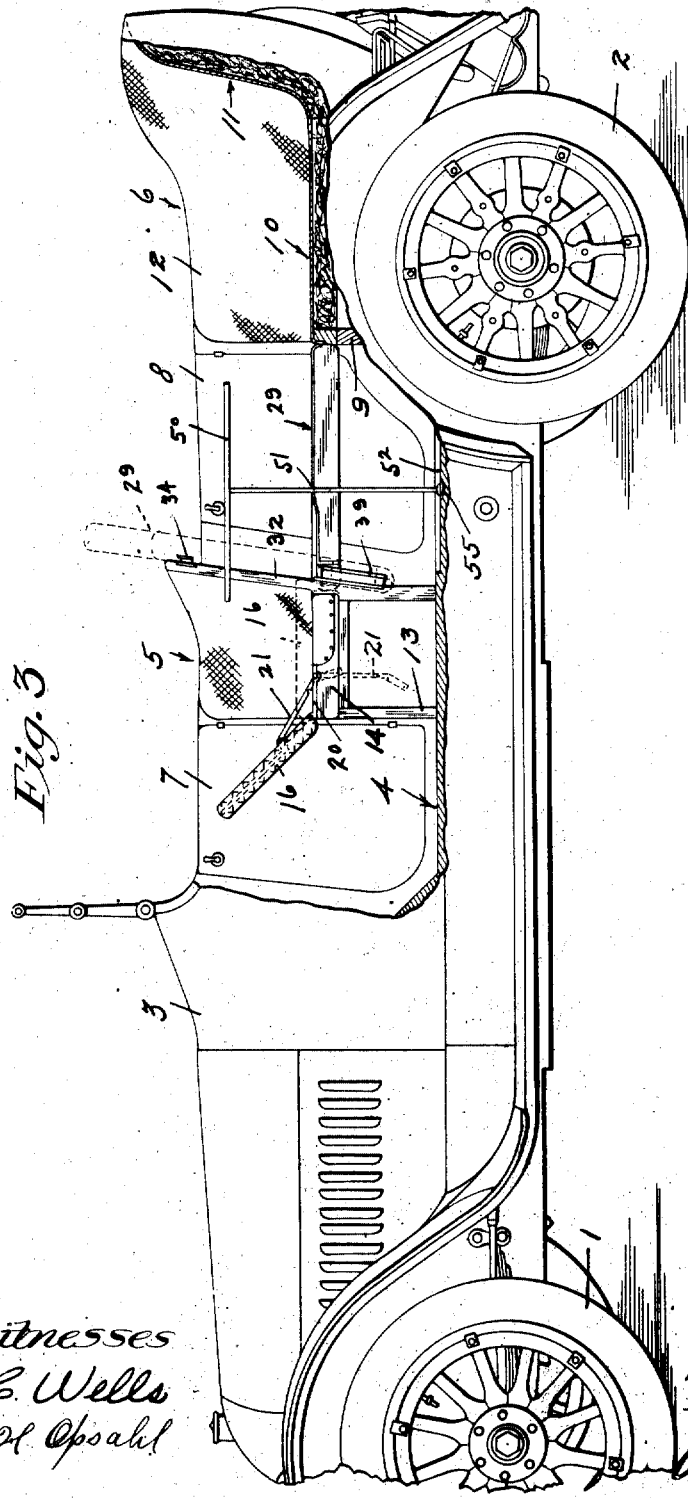

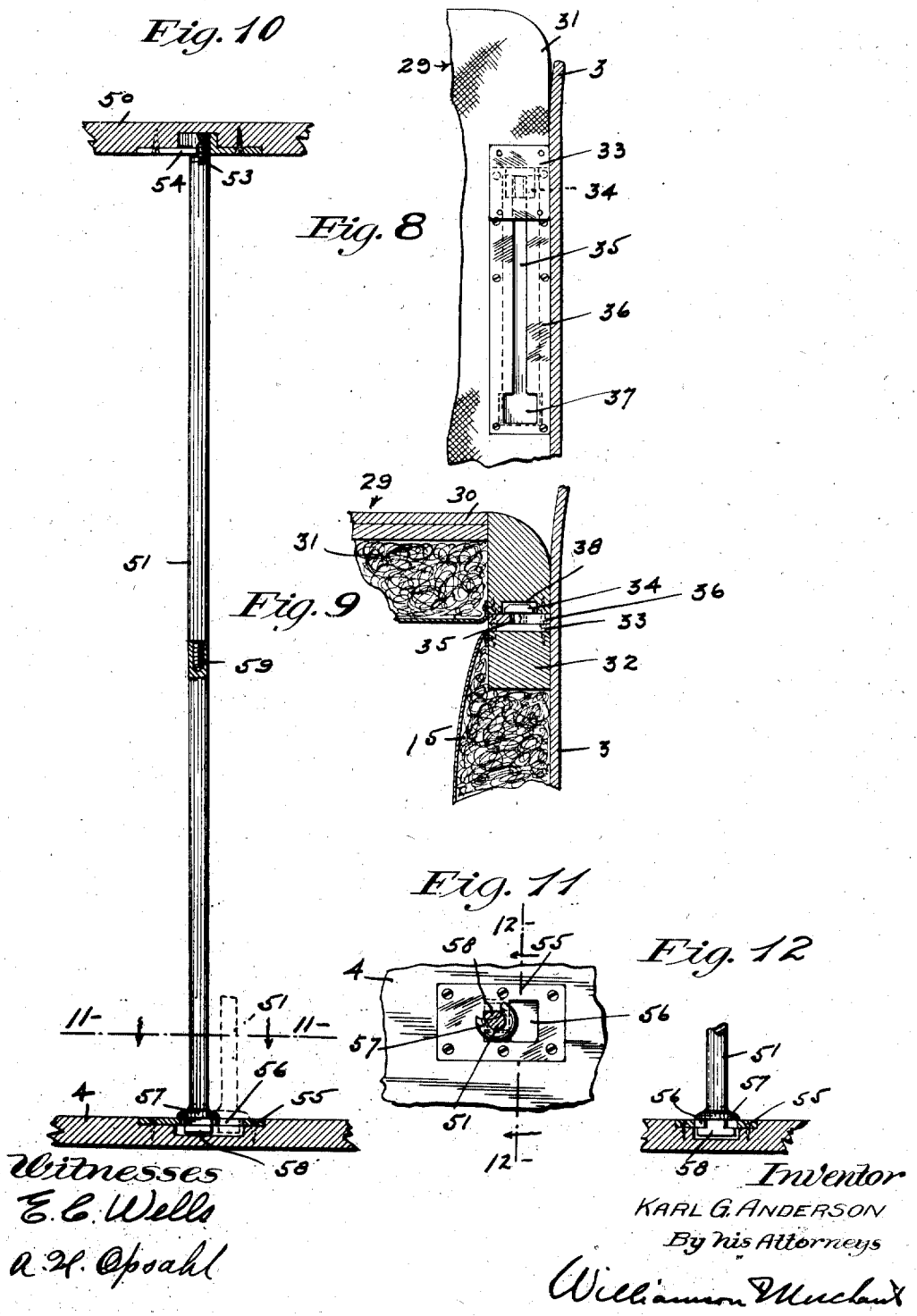

KARL G. ANDERSON, OF MINNEAPOLIS, MINNESOTA.

CONVERTIBLE AUTOMOBILE-BODY.

1,236,388.　　　　　　Specification of Letters Patent.　　Patented Aug. 14, 1917.

Application filed November 20, 1916. Serial No. 132,341.

*To all whom it may concern:*

Be it known that I, KARL G. ANDERSON, a citizen of the United States, residing at Minneapolis, in the county of Hennepin and State of Minnesota, have invented certain new and useful Improvements in Convertible Automobile-Bodies; and I do hereby declare the following to be a full, clear, and exact description of the invention, such as will enable others skilled in the art to which it appertains to make and use the same.

My invention has for its object to provide a convertible automobile body; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a plan view of a two-seated automobile, of the touring type, having the invention incorporated therein;

Fig. 2 is a fragmentary longitudinal section taken on the irregular line 2—2 of Fig. 1, on an enlarged scale;

Fig. 3 is a view partly in side elevation and partly in longitudinal section taken on the line 3—3 of Fig. 1, with the front seat adjusted to convert the left side of the body into a single bed;

Fig. 4 is a fragmentary view principally in section taken on the line 4—4 of Fig. 2;

Fig. 5 is a detail view, partly in plan and partly in section, taken on the line 5—5 of Fig. 2, with one of the back sections of the front seat turned down, as indicated by broken lines in Fig. 2;

Fig. 6 is a detail view principally in section taken on the line 6—6 of Fig. 5;

Fig. 7 is a detail view in section taken on the line 7—7 of Fig. 6;

Fig. 8 is a detail view with some parts sectioned on the line 8—8 of Fig. 2;

Fig. 9 is a detail view in section taken on the line 9—9 of Fig. 2;

Fig. 10 is a view partly in side elevation and partly in section taken on the line 10—10 of Fig. 1, on an enlarged scale;

Fig. 11 is a fragmentary plan view with some parts sectioned on the line 11—11 of Fig. 10; and Fig. 12 is a detail view partly in elevation and partly in section taken on the line 12—12 of Fig. 11.

The numerals 1 and 2 indicate, respectively, the front and rear wheels of an automobile and the body thereof, in which the invention is incorporated, is indicated, as an entirety, by the numeral 3, with the exception of the floor 4, front seat 5, rear seat 6, fore doors 7 and aft doors 8. The parts thus far described, with the exception of the front seat 5, may be of the usual or any desired construction.

The rear seat 6 is supported on a frame work 9 and is provided with the customary seat, back and side upholstering, as indicated by the numerals 10, 11 and 12, respectively.

The front seat 5 is constructed upon a framework 13 and is upholstered, as indicated by the numeral 14, the full width of the body 3. The sides of the seat 5 are also upholstered, as indicated by the numeral 15. Supported on the upholstering 14 of the seat 5 are two individual seat sections 16, each comprising a horizontal U-shaped metal frame 17 upon and around which is secured upholstering 18. The free ends of the prongs of the frames 17 extend toward the front of the body 3 and have on their outer ends hinge lugs 19, which are pivoted to hinge plates 20 rigidly secured by screws to the framework 13. These hinge connections 19—20 permit the seat sections 16 to be turned, independently, forward into horizontal position in front of the seat 5 to form an extension thereof, as indicated by broken lines in Figs. 1 and 2. To hold the seat sections 16 in this position, each thereof is provided with a pair of arms 21 pivoted to lugs 22 integrally formed, one on each of the prongs of the respective frame 17. These arms 21 extend downward through co-incident slots 23 and 24 formed, respectively, in the rear end portions of the hinge plates 20 and the framework 13. The free ends of the arms 21 are bent, as indicated at 25, and terminate in T-heads 26. The slots 23 are just wide enough to permit free movement of the arms 21 therein, while the slots 24 are of sufficient width to allow the T-head 26 to enter the same and engage the under faces of the hinge plates 20 as stops to limit the forward swinging movement of the seat sections 16. The bent end portions 25 of the arms 21 permit said arms to extend parallel with the hinge plates 20, when the seat sections 16 are turned, as indicated by broken lines in Figs. 1 and 2. Each arm 21 is provided with two longitudinally spaced lock notches 27. These lock notches 27, of the several arms 21, are arranged to engage teeth 28 formed, one with each of the hinge plates 20 and extend into the front end of the slot 23 thereof. With the lock notches 27 engaging the teeth 28, the arms 21 support the seat sections 16 in different inclined positions, as indicated by broken lines in Fig. 2.

For each seat section 16, is an individual back section 29 comprising a frame 30 and upholstering 31. This upholstering 31 extends back of the end upholstering 15 and below the seat sections 16. An upright bar 32 is rigidly secured to each side of the body 3, within the rear vertical edge portions of the upholstering 15. On the rear face of each bar 32, at the upper end thereof, is secured, by screws, an anchor plate 33 having a rearwardly projecting T-head 34. The necks of these T-heads 34 work in long vertical slots 35 formed in plates 36 secured, by screws, to the outer uprights of the frames 30 of the back sections 29. The slots 35 have a width sufficient to permit the necks of the T-heads 34 to freely work therein, but the heads thereof cannot pull therethrough. In each plate 36, at the lower extremity of its slot 35, is a passageway 37 for the T-heads 34 to permit their necks to enter or be removed from said slots. The frames 30, underlying the slots 35, are channeled at 38 to receive the T-heads 34. Obviously, the interlocked T-heads 34 and plates 36 connect the outer end portions of the back sections 29 to the body 3, with freedom for rising and lowering movements and to be detached therefrom, when raised by a rearward movement of the back sections, to carry the T-head 34 through the passageways 37.

On the back of the framework 13 for the seat 5, are four vertical T-rails 39 having base flanges 40, through which screws are passed to rigidly secure said rails to the framework. There are two of these rails 39 for each back section 29 and the upper ends of these base flanges 40 are substantially flush with the upper surface of the upholstering 14 of the seat 5. The rails 39 and their webs terminate short of the upper ends of their flanges 40. In the upper end of each base flange 40, are two passageways 41 located, one on each side of the web of the respective rail 39 and with their lower edges in the same plane with the upper end of said rail. Integrally formed with the outer vertical edge portion of each passageway 41, is a depending lock tooth 42. The framework 13, back of each pair of passageways 42, is cut away to form a cavity 43.

Coöperating with each rail 39, is a bifurcated lock plate 44. These lock plates 44 are secured, by screws, in vertical positions to the front faces of the uprights of the frames 30 of the back sections 29. The prongs of these lock plates 44 extend downward and straddle the webs of the rails 39, with freedom for vertical sliding movement thereon. Said prongs are reinforced by forming on their inner faces, at the inner edges thereof, flanges 45 which extend into channels 46 formed in the frames 30 to receive the rails 39. When the rails 39 are in the channels 46, they are directly engaged by the flanges 45 of the lock plates 44 and support the back sections 29 in upright positions.

The transverse portions of the lock plates 44, between the prongs thereof, engage the upper ends of the webs of the rails 39 and act as stops to limit the downward movement of the back sections 29. The lower ends of the prongs of the lock plates 44 extend below the lower horizontal edges of the back sections 29 and each pair thereof is rigidly connected at their backs by a laterally projecting bracket 47. These brackets 47 extend under the lower edges of the back sections 29 and are secured thereto by screws and assist in rigidly connecting the lock plates 44 to said back sections. When the back sections 29 are lifted to carry the T-heads 34 into position to be moved through the passageways 37, the free ends of the prongs of the lock plates 44 are in position to clear the upper ends of the base flanges 40 of the rails 39. With the back sections 29 in this position, the same may be swung backward into horizontal position, as indicated by broken lines in Fig. 2. In the backward swinging movement of the back sections 29, the lower ends of the prongs of the lock plates 44 rest on the upper ends of the rails 39 as fulcrums and the sockets 43 afford clearance for their swinging movement.

When the back sections 29 are in horizontal position, they fill the space between the front and back seats and are supported, at their forward ends, on the rails 39 and, at their rear ends, on small brackets 48 secured to the framework 9 of the back seat 6. With the back sections thus supported, the upper surface of their upholstering 31 is substantially flush with the upper surfaces of the upholstering 14 of the front seat 5 and the upholstering 10 of the back seat 6.

The free ends of the prongs of the lock plates 44 extend into the passageways 41, when the back sections 29 are in horizontal position, and hold said back sections against lifting movement from the rails 39. To prevent complete separation of the lock plates 44 from the rails 39, during the swinging movement of the back sections 29, V-shaped cavities 49 are formed in the outer edge portions of the prongs of said lock plates into which the lock teeth 42 project, as best shown in Fig. 6.

From the above description, it is evident that by turning both seat sections 16 forward, either into a horizontal position or an inclined position, and by turning the back sections 29 backward between the two seats, the body 3 may be converted into twin beds. With the body thus converted, the upholstering 13, 14, 31 and 10 covers substantially the entire interior of the body, making the beds very comfortable. As each seat section 16 is independently adjustable, the occupants of the beds may adjust the same, as desired.

An automobile having a body, constructed in accordance with my invention, is very desirable for tourists, campers and hunters, as it saves carrying a tent and cots, and by putting up the top of the automobile and letting down the curtains, the occupants are well protected in all kinds of weather.

It is also evident that only one side of the body 3 may be converted to form a single bed. For instance, the left hand side of the body may be used as a single bed, leaving the driver's seat and one-half of the back seat free for occupants sitting upright. With the body thus converted, the automobile may be used as an ambulance.

As an attachment for the above described convertible body 3, I provide a table top 50 adapted to be supported on a single central standard 51 between the front and back seats 5 and 6. When not in use, this table top 50 may be placed in a recess 52 formed in the floor 4, between the two seats, with its upper surface flush with the upper surface of said floor, so that the same is entirely out of the way. The upper end of the standard 51 is provided with screw threads 53, adapting the same to be screwed into a socket 54 rigidly secured to the under side of the table top 50. Screwed to the floor 4, within the recess 52, is a lock plate 55 having a T-slot 56. On the lower end of the standard 51, is an annular flange 57 adapted to rest on the lock plate 55. Also formed on the lower end of the standard 51, below the flange 57, is a T-head 58 adapted to be inserted into the lock plate 55 by an endwise and lateral movement of the standard 51. As shown, the standard 51 is made in two sections and connected by the screw-threaded joint 59.

The location of the standard 51 is such that the table top 50 may be used by occupants sitting on the back seat, or when one-half of the body 3 is converted to form a single bed. By making the standard 51 in two sections, the same may be placed in the tool box of the automobile, or any other convenient place.

When the back sections 29 are in positions, as indicated by broken lines in Fig. 6, they may be entirely detached from the front seat by a lifting movement. With the back sections 29 removed from the front seat, occupants of the automobile may sit on the front seat and face the table top 50.

What I claim is:—

1. An automobile body having a seat, a back arranged to be turned into a horizontal position, a seat section hinged for movement from a position overlying said seat to a horizontal position in front thereof, and means for supporting said seat section in an oblique intermediate position.

2. An automobile body having front and rear seats, individual back sections for the front seat arranged to be independently moved into horizontal positions between said two seats, individual seat sections movably supported over the front seat and arranged to be independently moved into horizontal positions in front thereof, and means for supporting said seat sections in oblique intermediate positions.

3. An automobile body having a seat, a seat section hinged for movement from a position overlying said seat into a horizontal position, and common means for supporting said seat section from the seat in a horizontal position or in an intermediate oblique position.

4. An automobile body having a seat, a seat section overlying said seat and having a metal U-shaped frame around which said seat section is built with its prongs hinged to said seat for movement into a horizontal position in front of the seat, and a pair of arms pivoted to the intermediate portions of the prongs of said frame and adapted to support the seat section in its horizontal position or an intermediate oblique position.

5. An automobile body having front and rear seats, a back for the front seat, upright rails secured to the back of the front seat, lock plates on the back which interlock with said rails for holding the back in an upright position and on which rails the lock plates rest when the back is in a horizontal position, and means for holding the lock plate on the upper end of the rails.

In testimony whereof I affix my signature in presence of two witnesses. -

KARL G. ANDERSON.

Witnesses:
 CLARA DEMAREST,
 HARRY D. KILGORE.